Aug. 10, 1948.   A. FLUKES ET AL   2,446,988
ABSORPTION REFRIGERATION APPARATUS
Filed Sept. 25, 1944
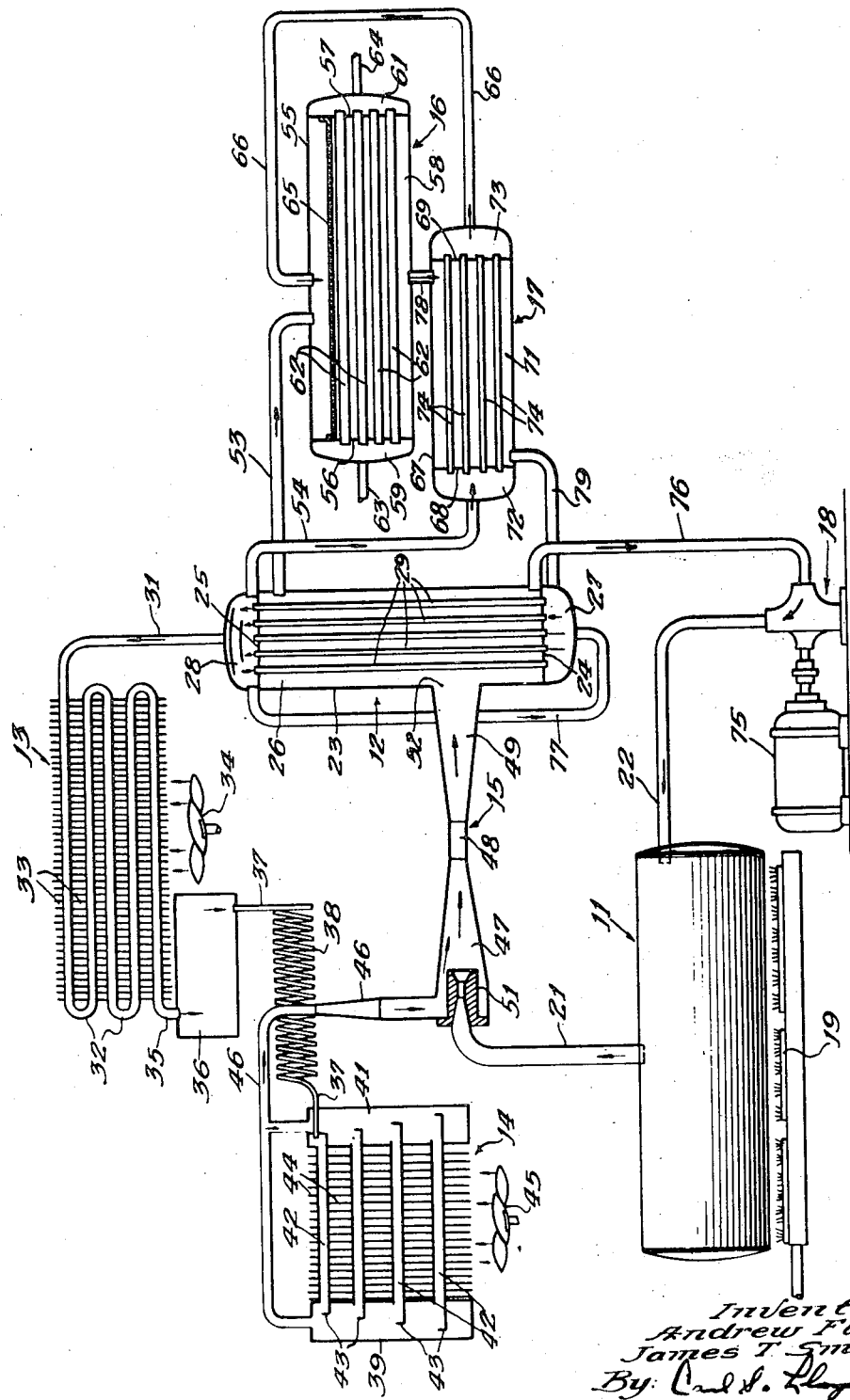
Inventors:
Andrew Flukes
James T. Smith
By
Attorney Patented Aug. 10, 1948

2,446,988

UNITED STATES PATENT OFFICE 2,446,988

ABSORPTION REFRIGERATION APPARATUS

Andrew Flukes and James T. Smith, Chicago, Ill., assignors to Mills Industries, Incorporated, Chicago, Ill., a corporation of Illinois Application September 25, 1944, Serial No. 555,710

9 Claims. (Cl. 62—119)

This invention relates to refrigeration apparatus and more particularly to refrigeration systems of the absorption type which are operated by heat.

The general object of the invention is to provide in a low-pressure absorption refrigeration system, effective and inexpensive means for increasing the pressure of the refrigerant vapor between the evaporator and the absorber of the system, thereby overcoming serious difficulties heretofore experienced in such systems when an adequate pressure differential between these two parts of the system has not been maintained.

A more particular object of the invention is to accomplish this result by use in the system of a booster pump, preferably of the jet ejector type, in conjunction with a heating and pumping fluid which serves the double function of applying heat to a solution of refrigerant and absorption liquid (to effect separation thereof) and of boosting the pressure of the refrigerant vapor.

It has been found that if the pressure in the absorber is not substantially higher than that in the evaporator it is necessary to employ a solution of refrigerant and absorption liquid containing a high concentration of the absorption liquid. This involves not only a high cost of the latter material but also instability of the solution, due to the tendency to precipitation of the salt content thereof when an absorption liquid, such as lithium bromide, for example, is used. Likewise it becomes necessary in such systems to make special and expensive provision for cooling the absorber, which must be maintained at a considerably lower temperature than if the pressure therein were greater. Both of these difficulties are in large measure overcome by the present invention.

A further advantage of the invention is that it renders feasible the use of a greater variety of refrigerants, absorption liquids and heating fluids, some combinations of which may be very inexpensive, than has heretofore been feasible. For example, when the present invention is employed, water may be used as the refrigerant and lithium bromide or other absorption liquid of low concentration may be used. Other examples of the refrigerant and of the absorption liquid than those above given, as well as examples of the heating fluid, which in the present instance is also used as a pumping fluid, will be hereinafter given. Suffice it to note here that regardless of the combination used, the pressure of the refrigerant vapor is increased after leaving the evaporator and before reaching the absorber by means of a booster device, preferably through the action of the heating fluid passing therethrough.

Other objects and advantages of the invention will be apparent from the following description of a preferred embodiment thereof, taken in connection with the accompanying drawing in which the single figure shows, in diagrammatic form, an absorption refrigeration system in which the invention is employed.

The system illustrated in said drawing comprises in general a boiler 11, a generator 12, a condenser 13, an evaporator 14, a booster pump 15, an absorber 16, a heat exchanger 17, and a condensate return pump 18, all interconnected to form a closed system, functioning as hereinafter described.

The boiler 11 is in the form of a tank beneath which is a burner or other suitable heating medium 19, the boiler having an outlet pipe 21 extending upwardly from the top thereof, and an inlet pipe 22 extending, as shown, into one end thereof.

The generator 12, in the present instance, comprises an outer casing 23, which may be of cylindrical form and is preferably vertically disposed. Said casing has partitions 24 and 25 near the bottom and top ends thereof, respectively, dividing the interior into a central chamber 26 and bottom and top chambers 27 and 28, respectively. Extending through the chamber 26, from the chamber 27 to the chamber 28, is a series of pipes 29, the ends of which pass through the partitions 24 and 25, said pipes thus communicably connecting the chambers 27 and 28. From the chamber 28 a pipe 31 leads upwardly and communicates with the condenser 13.

Said condenser 13 may be of the well known air-cooled type comprising a series of coils 32 of pipe having fins 33 thereon, a fan 34 being located beneath the condenser to direct air past the same for the purpose of dissipating heat absorbed by the refrigerant elsewhere in the system, in accordance with the usual function of a condenser. The outlet end 35 of the condenser coils opens into a receiver 36, and a conduit 37, including a coil 38, communicably connects the receiver with the evaporator 14.

Said evaporator 14, in the illustrative form shown, comprises two headers 39 and 41 connected by a series of tubes 42, beneath each of which is a tray 43, said tray being of progressively increasing length from top to bottom. The pipes 42 have fins 44 thereon and a fan 45 is or may be provided beneath said evaporator to move the air past the same, the evaporator of course serving the usual function of absorbing heat from the refrigerated space in which it is located. A pipe 46 leads from the evaporator to the booster pump 15.

Said booster pump 15, which, as shown, is of the jet ejector type such as is used in mechanisms operated by steam pressure, comprises a diffuser section 47 of tapering form, a diffuser throat 48 and a discharge section or tube 49, the latter also being tapered but in opposite manner to the diffuser section 47, so that the throat 48 forms a restricted passage between the sections 47 and 49. A nozzle 51, or a series of nozzles if a multi-stage system be used, is positioned in the enlarged end of the diffuser section 47 and communicates with the pipe 21 leading from the boiler 11. The pipe 46 leading from the evaporator opens into the enlarged end of said diffuser section of the pump around the nozzle 51. The pump has a discharge port 52 opening into the chamber 26 of the generator 23.

A pipe 53 leads from the upper end of said generator chamber 26 to the absorber 16 and another pipe, identified by the numeral 54, leads from the chamber 28 to the heat exchanger 17.

The absorber 16 may comprise a tank or housing 55 having partition plates 56 and 57 near the opposite ends thereof, dividing the space in the housing into an absorption chamber 58 and end chambers 59 and 61. Pipes 62, in desired number and arrangement, extend through the chamber 58, the opposite ends thereof being positioned in the plates 56 and 57, respectively, and said pipes providing communication between the chambers 59 and 61. An inlet pipe 63 opens into the chamber 59 and an outlet pipe 64 leads from the chamber 61. A cooling medium, such as water, is caused to enter the chamber 59 through the pipe 63, pass through the pipes 62 into the chamber 61 and thence out through the pipe 64. A perforated spray header 65 is provided in the top of the absorber tank and is adapted to receive strong solution from a pipe 66, and to distribute the same over the pipes 62, which, preferably, are arranged in horizontal as well as vertical banks. Refrigerant vapor enters the absorber through the pipe 53 and absorption of the refrigerant vapor by the strong solution then takes place on all liquid film surfaces throughout the absorber.

The heat exchanger 17, as shown, comprises a housing 67 having partition plates 68 and 69 therein, dividing the space in the housing into a middle chamber 71 and end chambers 72 and 73. Pipes 74 extending through the chamber 71 and communicably connect the chambers 72 and 73. The pipe 54 opens into the former chamber and the pipe 66 leads from the latter chamber to the top of the absorber, as above mentioned.

The condensate return pump 18 may be of conventional, or any desired, form and, as shown, is arranged to be driven by a motor 75. A pipe 76 connects the lower part of the generator chamber 26 with said pump 18 and the pipe 22 leads from the latter into the end of the boiler 11, as previously mentioned.

A pipe 77 connects the upper generator chamber 28 with the lower chamber 27 and serves to recirculate part of the absorption solution through the pipes 29.

The operation of the apparatus is as follows:

Assuming that the system has been properly charged with a refrigerant, an absorption liquid and a heating and pumping fluid and that the latter fluid is contained in the boiler 11, application of heat to the boiler will vaporize the heating fluid and, due to the increased pressure, will cause vapor to flow out of the boiler, through the pipe 21 and into the diffuser section 47 of the booster pump 15 through the nozzle 51. As the vapor passes through the nozzle 51 it is expanded, reduced in pressure with a resultant increase in velocity, and is caused to flow through the chamber 47 and into the throat 48 at high velocity and at low pressure. From the throat 48 the vapor flows into the discharge tube 49 at its high velocity and here the kinetic energy of the vapor is converted into pressure, thereby creating a substantial difference in pressure between the diffuser chamber 47 and the outlet end of the discharge chamber 49.

As will be later explained, the refrigerant vapor proceeding from the evaporator through the pipe 46 will be diffused and entrained with the heating fluid vapor in the diffuser chamber 47, and, as it is drawn through the pump, its pressure will be likewise increased.

From the booster pump the heating fluid vapor enters the chamber 26 of the generator in which the pipes 29 are located. These pipes and the chamber 27 contain combined refrigerant and absorption liquid and, as the pipes are heated by the heating fluid vapor, the latter gives up its latent heat and condenses into a liquid which collects at the bottom of the chamber 26 and is returned through the pipes 76 and 22 to the boiler by means of the return pump 18.

As the heating fluid condenses the temperature of the solution in the pipes or tubes 29 is quickly raised to its boiling point and, as it boils, a large quantity of refrigerant vapor is expelled from the solution. This sets up a vapor pumping action which causes the vapor and the solution to be forced upwardly into the chamber 28. The refrigerant vapor and the absorption liquid are further separated in this chamber, which therefore may be called a separating chamber.

From the chamber 28 the refrigerant vapor passes through the pipe 31 to the condenser 13 and the strong absorption liquid flows from said chamber 28 through the pipe 54 to the heat interchanger 17 where it flows through the pipes 74 countercurrently to the diluted solution, which flows through the chamber 71 of the heat interchanger, as will later be more fully explained.

As the refrigerant vapor flows into the condenser 13 it is condensed by the cooling action of the ambient atmosphere passing over the finned tubes 32. The condensed refrigerant then passes into the receiver 36 and from the latter through the connection 37 and coil 38 into the evaporator 14 where, under a reduction of pressure, it will expand and evaporate, producing a low temperature through this boiling action as is characteristic of evaporators in such refrigeration systems. The large quantity of vapor thus produced in the evaporator flows out of the evaporator through the pipe 46 and into the booster pump, as hereinabove mentioned. Upon becoming entrained with the heating fluid vapor and carried at high velocity through the throat 48 of the pump and through the discharge section 49, the pressure of such vapor is increased in the manner which has heretofore been set forth.

Upon entering the chamber 26 of the generator, the refrigerant vapor, which has a much lower condensation temperature than the heating fluid vapor, will flow up and out of the chamber 26 through the pipe 53 which opens into the space in the absorber tank above the spray header 65. The refrigerant vapor is condensed in the absorber and is absorbed by the concentrated absorption liquid flowing into the absorber through the pipe 66 and passing through the spray header 65 into the space around the pipes 62. The heat involved in the process of absorption of the vapor and consequent dilution of the concentrated solution is conducted away from the absorber by the cooling medium flowing through the pipes 63, 62 and 64.

The diluted solution flows out of the chamber 58 of the absorber tank by way of a conduit 78 leading into the space 71 in the heat interchanger. Such solution, which is cooler than the strong solution flowing through the pipes 74, flows in the opposite direction to the flow of the solution in said pipes and tends to cool the latter. The diluted solution then passes out of the chamber 71 through a pipe 79 into the lower generator chamber 27, thus completing the cycle of operation.

It will be apparent from the above description of the apparatus, and of the operation thereof, that a pressure is at all times maintained in the absorber substantially above that in the evaporator and that this is, or may be, accomplished by the action of the heating fluid, which then acts also as a pumping fluid, without requiring the use of any additional substances than would be required otherwise and without requiring additions to the structure other than the interposition of the simple booster pump above described.

It may be noted at this point that the absorber 16 is so located with reference to the generator that the difference in pressure beween the generator and the absorber will cause the concentrated solution to flow from the generator to the absorber; also, that the height of the absorber is such as to produce a liquid head in the conduit 78 which is sufficient to counterbalance the vapor pressure in the generator so that the diluted solution will flow from the absorber into the generator by gravity.

While the invention is not confined to the use of any specific refrigerant, absorption liquid or heating and pumping fluid, water has been found to be a suitable refrigerant, lithium bromide a suitable absorption liquid, and a mixture of approximately two-thirds diphenyl oxide and approximately one-third diphenyl, known commercially as Dowtherm A, a suitable heating and pumping fluid. These may be regarded as preferred fluids and a preferred combination, but the following materials, preferably in the combinations indicated, are possible alternatives:

| Refrigerant | Absorption Liquid | Heating and Pumping Fluid |
| --- | --- | --- |
| 1. Carbon tetrachloride | Lithium chloride | Mercury. |
| 2. Methyl alcohol | Triethylene glycol | Ethylhexanol. |
| 3. Methylene chloride | Dipropylene glycol | Tetradecanol. |

Water may be used as the heating and pumping fluid as well as the refrigerant and when so used butyl carbitol, for example, may be used as the absorption liquid.

Other materials and combinations may also be feasible, bearing in mind that for best results the primary or pumping fluid and the secondary or refrigerant fluid should be readily diffusible with each other, and that the absorption fluid should have a high degree of absorptive capacity in respect to the refrigerant.

The foregoing detailed description has been given for clearness of understanding only, and no unnecessary limitations should be understood therefrom, but the appended claims should be construed as broadly as permissible in view of the prior art.

We claim:

1. Absorption refrigeration apparatus comprising a closed system, including a boiler, a generator, a condenser, an evaporator and an absorber and containing a refrigerant, an absorption liquid and a heating fluid, means for conducting the heating fluid in vapor form from the boiler to the generator, means for conducting the refrigerant in vapor form from the evaporator to the absorber, and a device comprising a diffuser in which said vapors are combined and a restricted passage through which the combined vapors pass for increasing, through the action of the heating fluid in passing through said device, the pressure of said refrigerant vapor while said vapors are being so conducted.

2. Absorption refrigeration apparatus comprising a closed system, including a boiler, a generator, a condenser, an evaporator and an absorber and containing a refrigerant, an absorption liquid and a heating fluid, means for conducting the heating fluid in vapor form from the boiler to the generator, means for conducting the refrigerant in vapor form from the evaporator to the absorber, and a device forming a part of both of said conducting means and comprising a diffuser in which said vapors are combined and a restricted passage through which the combined vapors pass for increasing, through the action of the heating fluid in passing through said device, the pressure of said refrigerant vapor while the said vapors are being so conducted.

3. Absorption refrigeration apparatus comprising a closed system, including a boiler, a generator, a condenser, an evaporator and an absorber and containing a refrigerant, an absorption liquid and a heating fluid, means for conducting the heating fluid in vapor form from the boiler to the generator, means for conducting the refrigerant in vapor form from the evaporator to the absorber, and a jet ejector device forming a part of both of said conducting means for increasing the pressure of refrigerant vapor while the said vapors are being so conducted.

4. Absorption refrigeration apparatus comprising a closed system, including a boiler, a generator, a condenser, an evaporator and an absorber and containing a refrigerant, an absorption liquid and a heating fluid, means for conducting the heating fluid in vapor form from the boiler to the generator, means for conducting the refrigerant in vapor form from the evaporator to the absorber, and a booster pump forming a part of both of said conducting means and in which the pressure of the refrigerant vapor is increased by the action of the heating fluid vapor in passing through said pump.

5. Absorption refrigeration apparatus comprising a closed system, including a boiler, a generator, a condenser, an evaporator and an absorber and containing a refrigerant, an absorption liquid and a heating fluid, means for conducting the heating fluid in vapor form from the boiler to the generator, means for conducting the refrigerant in vapor form from the evaporator to the absorber, and a booster pump of the jet ejector type forming a part of both of said conducting means and in which the pressure of the refrigerant vapor is increased by the action of the heating fluid vapor in passing through said pump.

6. Absorption refrigeration apparatus comprising a closed system, including a boiler, a generator, a condenser, an evaporator and an absorber containing a refrigerant, an absorption liquid and a pumping fluid, means for conducting the pumping fluid in vapor form from the boiler to the generator, means for conducting the refrigerant in vapor form from the evaporator to the absorber, and a booster pump of the jet ejector type forming a part of both of said conducting means for increasing, through the action of the pumping fluid vapor passing therethrough, the pressure of the refrigerant vapor whereby the latter has a higher pressure in the absorber than in the evaporator.

7. Absorption refrigeration apparatus comprising a closed system, including a boiler, a generator, a condenser, an evaporator and an absorber and containing a refrigerant, an absorption liquid and a heating fluid, means for conducting the heating fluid in vapor form from the boiler to the generator, means for conducting the refrigerant in vapor form from the evaporator to the absorber, and a booster device forming a part of both of said conducting means for increasing, through the action of the heating fluid vapor in passing therethrough, the pressure of the refrigerant vapor whereby the latter has a higher pressure in the absorber than in the evaporator.

8. Absorption refrigeration apparatus comprising a closed system, including a boiler, a generator, a condenser, an evaporator and an absorber and containing a refrigerant, an absorption liquid and a pumping fluid, means for conducting the pumping fluid from the boiler to the generator means for conducting the refrigerant in vapor form from the evaporator to the absorber, and a booster pump of the jet ejector type through which the pumping fluid, in vapor form, is caused to pass at high velocity and to entrain therewith the refrigerant vapor as the latter is being conducted from the evaporator to the absorber, thereby increasing the pressure of said refrigerant vapor.

9. Absorption refrigeration apparatus comprising a closed system, including boiler, a generator, a condenser, an evaporator and an absorber and containing a refrigerant, an absorption liquid and a pumping fluid, means for conducting the pumping fluid from the boiler to the generator means for conducting the refrigerant in vapor form from the evaporator to the absorber, and a pressure-increasing device in said conducting means adapted, through action of the pumping fluid, which is caused to pass therethrough at high velocity, to increase the pressure of the refrigerant vapor, whereby the latter is caused to have a higher pressure in the absorber than in the evaporator.

ANDREW FLUKES.
JAMES T. SMITH.

REFERENCES CITED

The following references are of record in the file of this patent:

UNITED STATES PATENTS

| Number | Name | Date |
| --- | --- | --- |
| 607,849 | Hampson | July 26, 1898 |
| 1,134,269 | Heister | Apr. 6, 1915 |
| 1,894,359 | Nesselmann et al. | Jan. 17, 1933 |
| 1,922,217 | Randel | Aug. 15, 1933 |

FOREIGN PATENTS

| Number | Country | Date |
| --- | --- | --- |
| 669,024 | France | Nov. 9, 1929 |